(12) United States Patent
Tucker

(10) Patent No.: US 12,522,017 B2
(45) Date of Patent: Jan. 13, 2026

(54) HANDLE DEVICE

(71) Applicant: Rosanne Tucker, Wheeling, WV (US)

(72) Inventor: Rosanne Tucker, Wheeling, WV (US)

(*) Notice: Subject to any disclaimer, the term of this patent is extended or adjusted under 35 U.S.C. 154(b) by 114 days.

(21) Appl. No.: 18/325,196

(22) Filed: May 30, 2023

(65) Prior Publication Data

US 2023/0398811 A1 Dec. 14, 2023

Related U.S. Application Data

(60) Provisional application No. 63/366,268, filed on Jun. 13, 2022.

(51) Int. Cl.
*B44D 3/18* (2006.01)
*F16M 13/02* (2006.01)

(52) U.S. Cl.
CPC .............. *B44D 3/185* (2013.01); *F16M 13/02* (2013.01)

(58) Field of Classification Search
CPC .......... F16M 13/02; B44D 3/185; B44D 3/18; B65G 7/12; A45F 5/10; A45F 2005/1006; A47B 97/04; A47G 2001/1693; A47G 1/16
USPC ... 248/684, 188, 188.1, 188.8, 188.9, 145.6, 248/309.2, 151, 218.3, 346.01, 346.03; 16/406, 422, 110.1
See application file for complete search history.

(56) References Cited

U.S. PATENT DOCUMENTS

| | | | | |
|---|---|---|---|---|
| 941,212 | A * | 11/1909 | Tolman | A45C 13/22 294/162 |
| 3,563,432 | A | 2/1971 | Sage et al. | |
| 3,920,213 | A * | 11/1975 | Hanson, Jr. | A47B 97/04 248/455 |
| 4,017,048 | A * | 4/1977 | Einhorn | A47G 1/18 248/216.1 |
| 4,036,424 | A * | 7/1977 | Thany | B65D 5/46016 294/93 |
| 5,048,788 | A * | 9/1991 | Lorincz | F16B 15/003 248/496 |
| 5,236,168 | A * | 8/1993 | Roy | F16B 15/0015 248/498 |
| 6,061,972 | A * | 5/2000 | Thorp | E04B 2/7401 40/606.03 |
| 6,102,461 | A * | 8/2000 | Rooney | A47F 5/0006 294/142 |
| 6,412,838 | B1 * | 7/2002 | Malamud | B65G 7/12 294/15 |
| 7,793,909 | B2 | 9/2010 | Sawyer | |
| 11,419,416 | B2 * | 8/2022 | Hayslett | A47B 97/08 |

(Continued)

OTHER PUBLICATIONS

"The Original Sawyer Canvas Bridge for Edge-to-Edge Painting," [https://www.jerrysartarama.com/canvas-bridge-sawyer], retrieved on Apr. 11, 2023.

(Continued)

*Primary Examiner* — Ingrid M Weinhold
(74) *Attorney, Agent, or Firm* — Chrisman Gallo Tochtrop LLC

(57) ABSTRACT

A handle device for a canvas panel includes a main body having a grip member, the grip member being an elongated body with one or more curved gripping surfaces. The handle device further includes a pin protruding from the main body, wherein the handle device is removably attachable to the canvas panel by inserting the pin into the canvas panel.

15 Claims, 8 Drawing Sheets

(56) References Cited

U.S. PATENT DOCUMENTS

| | | | | |
|---|---|---|---|---|
| 12,036,816 | B2* | 7/2024 | Proctor | B44D 3/18 |
| 2008/0105817 | A1* | 5/2008 | Damman | A45F 5/10 |
| | | | | 248/684 |
| 2010/0019114 | A1 | 1/2010 | Vargo | |
| 2014/0083056 | A1* | 3/2014 | Grove | B44D 3/185 |
| | | | | 53/472 |
| 2018/0116431 | A1* | 5/2018 | Thompson | A47G 1/175 |
| 2022/0185004 | A1* | 6/2022 | Proctor | B44D 7/00 |
| 2023/0233002 | A1* | 7/2023 | Shmith | A47G 1/16 |
| | | | | 248/475.1 |

OTHER PUBLICATIONS

"Push Pins X-large Canvas Supports Acrylic Art—Etsy," [https://www.etsy.com/listing/902091053/push-pins-x-large-canvas-supports], retrieved on Apr. 11, 2023.

* cited by examiner

HANDLE DEVICE

CROSS-REFERENCE TO RELATED APPLICATIONS

This application claims the benefit of U.S. provisional application Ser. No. 63/366,268 filed Jun. 13, 2022, the contents of which are incorporated by reference.

FIELD OF THE DISCLOSURE

The present disclosure relates generally to a handle device, and more particularly, to a handle device for supporting a canvas panel.

BACKGROUND OF THE INVENTION

Canvas panels typically comprise a rigid, wooden frame and a layer of canvas fabric that is stretched tightly across the frame and secured thereto using, for example, adhesive, staples, etc. As assembled, the canvas fabric provides a planar surface that artists commonly use as a painting surface. Conventionally, a canvas panel may be placed on an easel or a table for support, allowing an artist to paint on the canvas panel while it rests on the easel or table.

SUMMARY OF THE INVENTION

According to a first aspect, a handle device for a canvas panel includes a main body and a pin protruding from the main body, the main body including a grip member that is an elongated body with one or more curved gripping surfaces. The handle device is removably attachable to the canvas panel by inserting the pin into the canvas panel.

According to a second aspect, a handle device for a canvas panel includes a main body having a grip member; a first standoff member extending from the main body; and a pin protruding from the main body. The handle device is removably attachable to the canvas panel by inserting the pin into the canvas panel. Moreover, the handle device is configured to rest on a planar surface in a resting position such that the first standoff member rests directly on the planar surface and supports the main body, and a gap is present between the planar surface and the grip member.

According to a third aspect, a handle device for a canvas panel includes a main body having a abutment member, the abutment member being an elongated body having an abutment surface that is planar; a grip member; and a first spacing member having one end attached to the abutment member and another end attached to the grip member such that the first spacing member spaces the grip member from the abutment member. The handle device further includes a first pin protruding from the abutment surface of the abutment member. The handle device is removably attachable to the canvas panel by inserting the pin into the canvas panel such that the abutment surface of the abutment member abuts and extends flush against the canvas panel.

BRIEF DESCRIPTION OF THE DRAWINGS

Embodiments of the invention are better understood when the following detailed description is read with reference to the accompanying drawings, in which.

DETAILED DESCRIPTION

Figure 1:
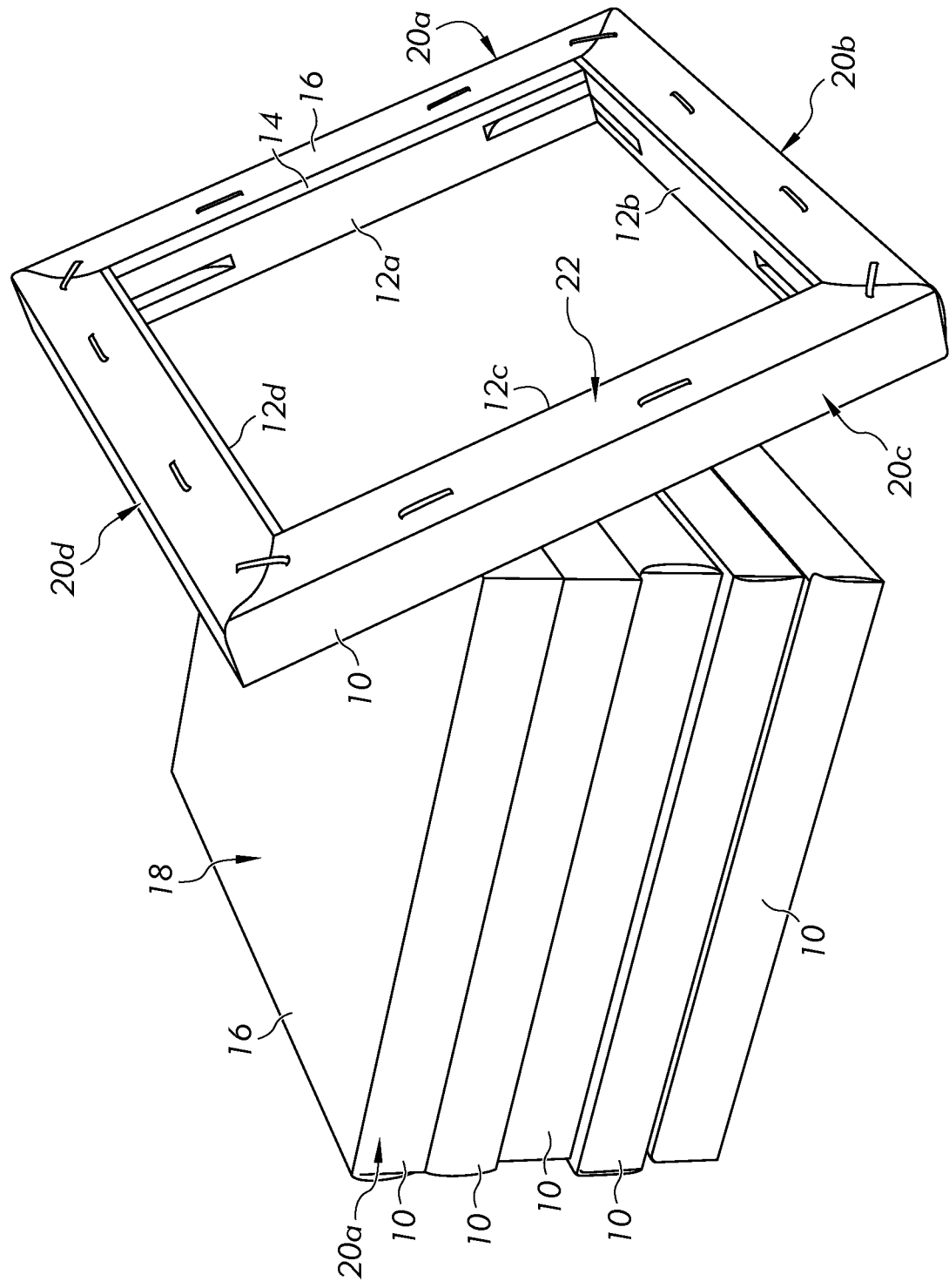
FIG. 1 shows a plurality of example canvas panels.

Referring to FIG. 1, a plurality of example canvas panels 10 are shown, wherein each canvas panel 10 includes a plurality of wooden frame members 12a-d that are assembled together to form a rigid, wooden frame 14. Each canvas panel 10 further includes a layer of canvas fabric 16 that is stretched tightly across a front side of the frame 14, wrapped around the sides of the frame 14, and secured to a back side of the frame 14 using staples. As assembled, the canvas fabric 16 provides a planar front surface 18 and a plurality of side surfaces 20a-d that an artist can use as painting surfaces. Moreover, each panel 10 has a planar rear surface 22 that is opposite to its front surface 18. However, each canvas panel 10 can comprise other configurations without departing from the scope of this disclosure. Broadly speaking, each canvas panel 10 can comprise any configuration in which a canvas fabric is secured to a frame to provide one or more painting surfaces for an artist.

Conventionally, each canvas panel 10 may be placed on an easel or a table for support, allowing an artist to paint on the canvas panel 10 while it rests on the easel or table. However, various portions of the easel or table may touch or otherwise block side surfaces 20a-d of the canvas fabric 16, thereby impeding the ability to paint those surfaces. Moreover, an easel or table typically will only support the canvas panel 10 in a specific orientation, which may not be desirable for certain painting techniques. If a painter wants to arrange the canvas panel 10 in a different orientation, they typically have to manipulate and sometimes support the canvas panel 10 directly by hand, which can be problematic for several reasons. For example, it may be difficult for the painter to firmly grip the panel 10, particularly if the side surfaces 20a-d have paint on them and cannot be touched. Accordingly, a handle device will now be described that a user can removably attach to the panel 10 for handling and supporting the panel 10 while painting.

Figure 2:
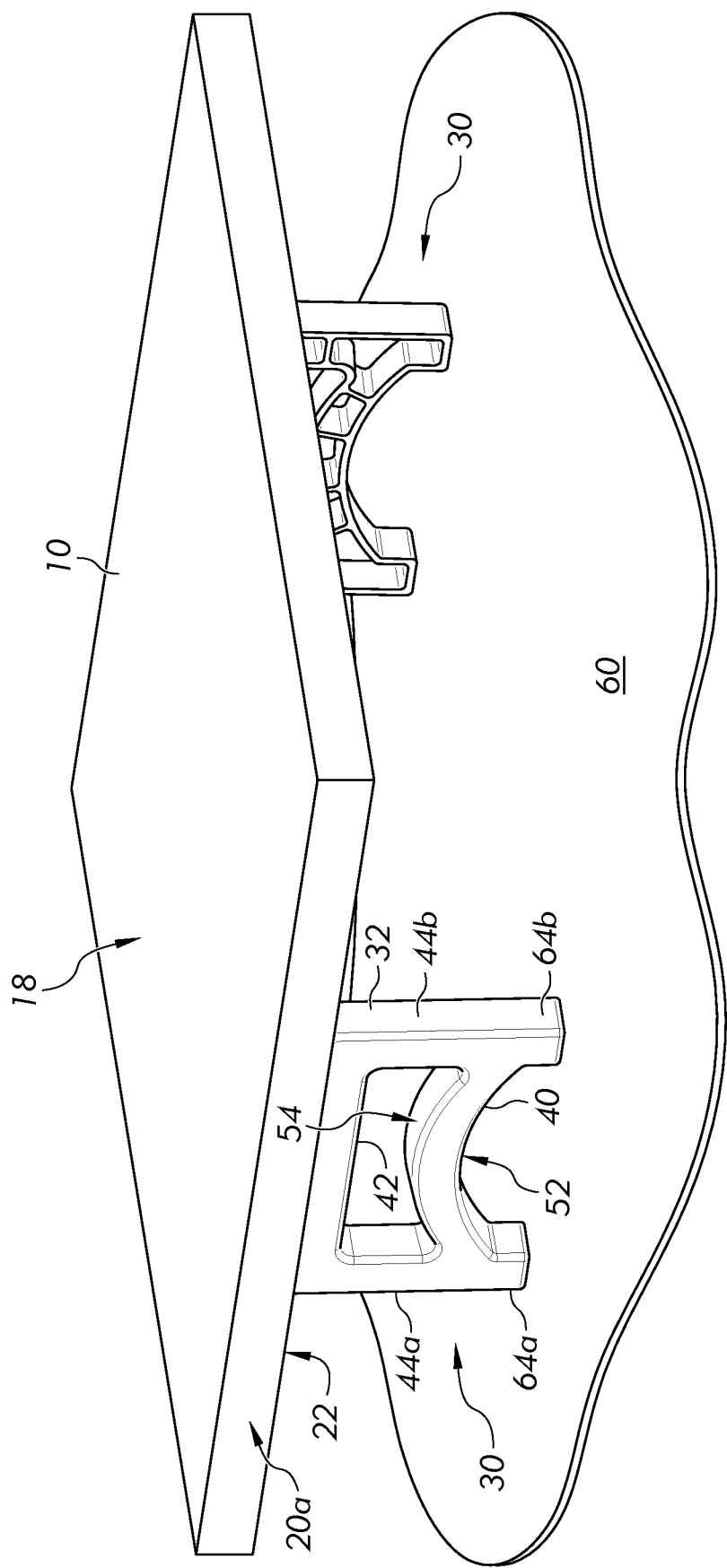
FIG. 2 is a perspective view of an example handle device removably attached to one of the example canvas panels.
Figure 3:
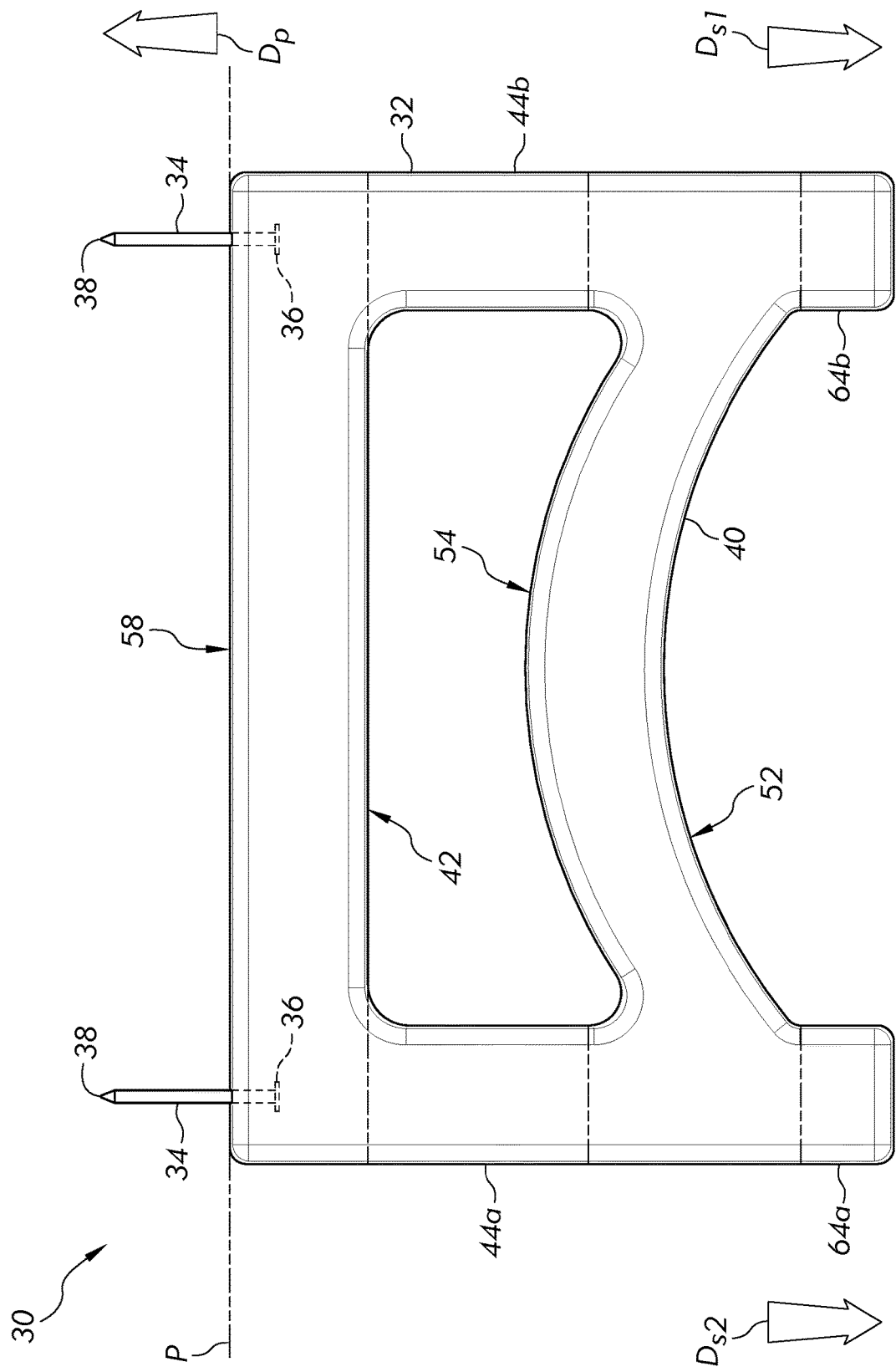
FIG. 3 is a front view of the handle device.
Figure 4:
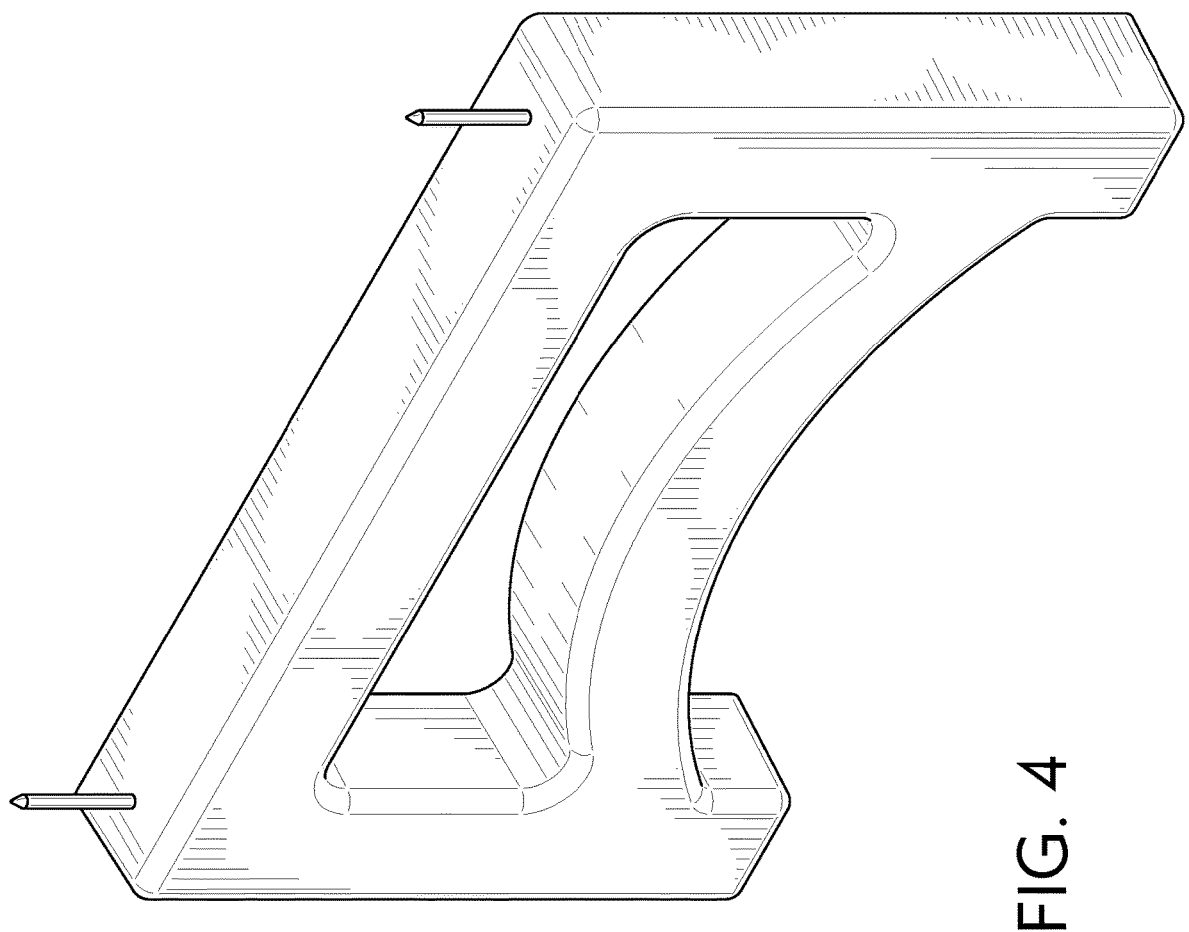
FIG. 4 is perspective view of the handle device.
Figure 5:
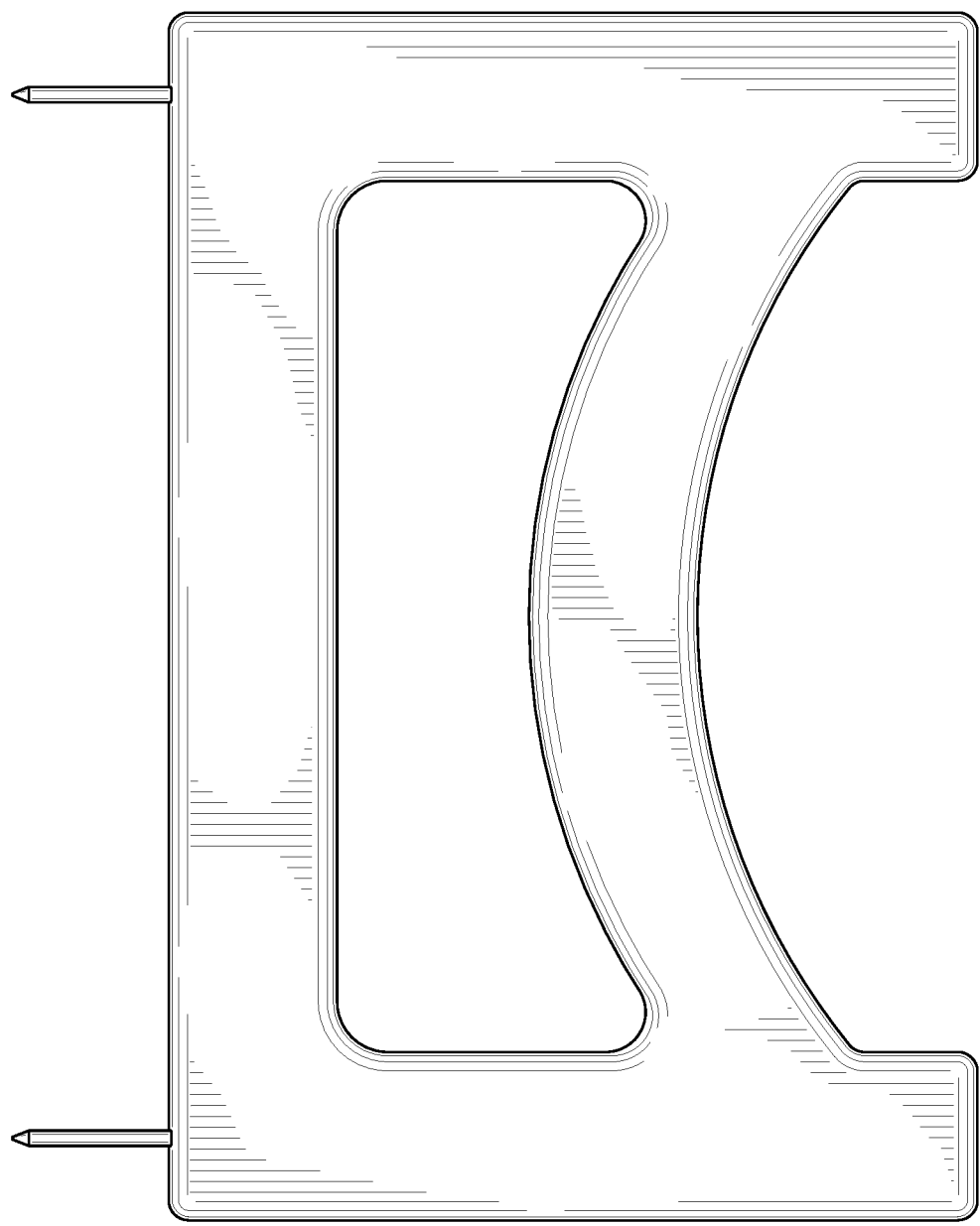
FIG. 5 is another front view of the handle device.
Figure 6:
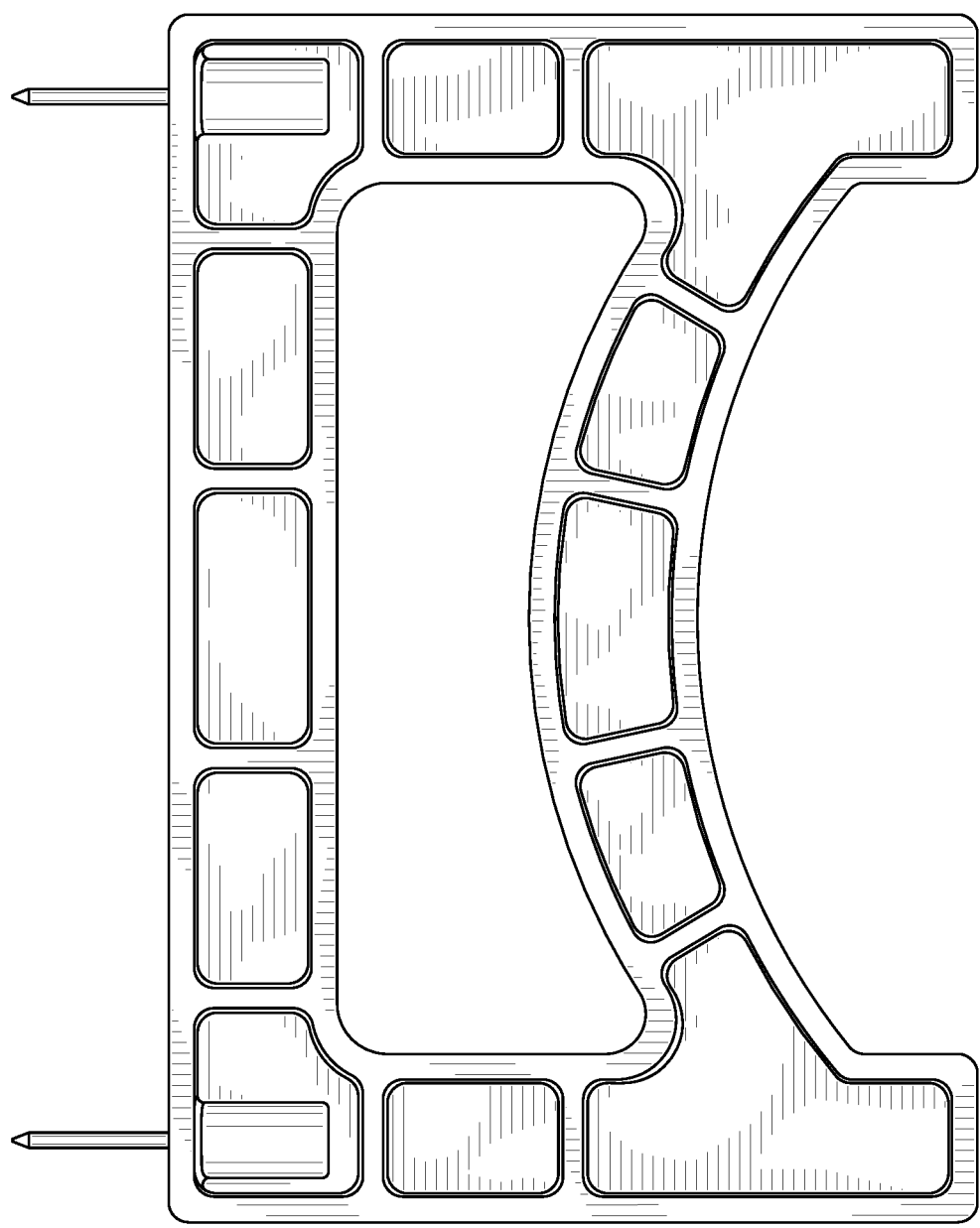
FIG. 6 is a rear view of the handle device.
Figure 8:
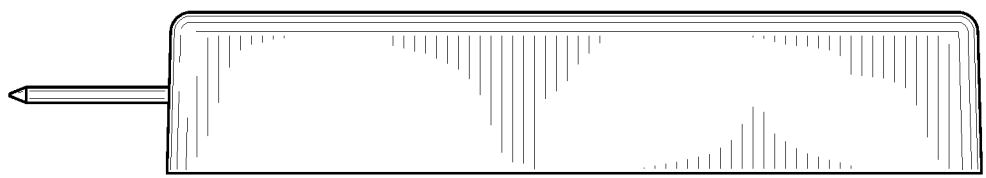
FIG. 8 is a right-side view of the handle device.
Figure 7:
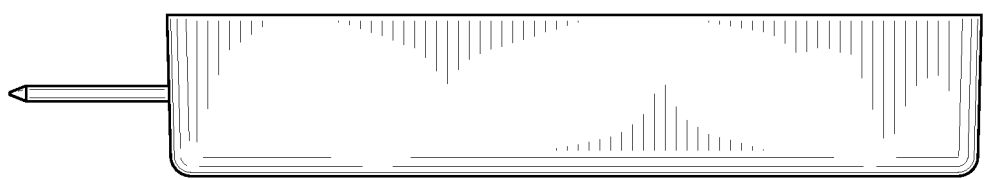
FIG. 7 is a left-side view of the handle device.
Figure 9:
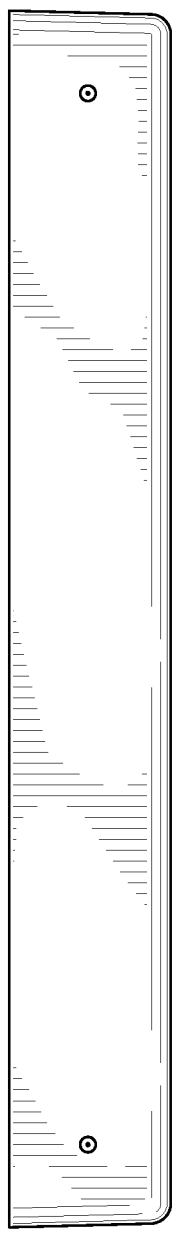
FIG. 9 is a top view of the handle device.
Figure 10:
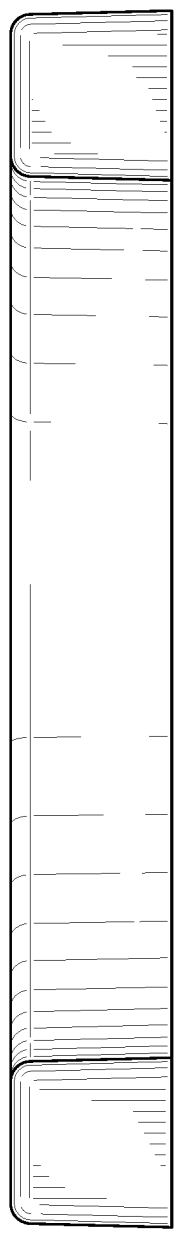
FIG. 10 is a bottom view of the handle device.

Turning to FIGS. 2 & 3, an example handle device 30 is shown that includes a main body 32 and a plurality of pins 34 fixed to and protruding from the main body 32. In the present embodiment, the main body 32 is a monolithic body comprising plastic that is injection molded to form the body. Moreover, each pin 34 comprises an elongated, metal body having one end portion 36 molded into the main body 32, and an opposite end portion 38 that is exposed from the main body 32 and has a pointed tip. The pins 34 are arranged such that they protrude from the main body 32 substantially parallel to each other in a pin direction $D_p$.

The handle device 30 can be removably attached to a canvas panel 10 (see FIG. 2) by pushing its pins 34 along the pin direction $D_p$ into a portion of the canvas panel 10. For example, the pins 34 can be pushed into the rear surface 22 of the panel 10 until the main body 32 abuts and is flush with the rear surface 22. A user can then grip and manipulate the main body 32 as desired to support and/or manipulate the panel 10 attached thereto, without having to touch the painting surfaces 18, 20a-d of the panel 10. Moreover, by attaching the handle device 30 to the rear surface 22 of the panel 10, the painting surfaces 18, 20a-d of the panel 10 can be accessible for painting without being blocked or covered by the handle device 30.

Further details and example structure of the handle device 30 are described below. However, it is to be appreciated that the main body 32 and pins 34 of the handle device 30 can comprise a variety of different configurations without departing from the scope of this disclosure. For instance, the main body 32 can comprise a rigid, wooden body, and the pins 34 can be fixed to the main body 32 via fasteners or other means such that they project therefrom in the same or different directions. Generally speaking, the handle device 30 can comprise any configuration having a main body and one or more pins fixed thereto that can be pushed into the canvas panel 10 to removably attach the handle device 30 to the panel 10.

In some examples, the main body 32 of the handle device 30 can comprise a plurality of members that are fixed together and collectively form the main body 32. For instance, the main body 32 in the present example includes a grip member 40, an abutment member 42, and first and second spacing members 44a, 44b, which are described below in further detail. Broken lines are provided in FIG. 3 to indicate where the members 40, 42, 44a, 44b meet and interface with each other.

The grip member 40 is an elongated body having one or more curved gripping surfaces for accommodating a user's hand. In particular, the grip member 40 has a concave gripping surface 52 on one side of the member 40 that faces away from the canvas panel 10 (and abutment member 42) when the handle device 30 is attached thereto, and a convex gripping surface 54 on an opposite side of the member 40 that faces the canvas panel 10 (and abutment member 42) when the handle device 30 is attached thereto. The surfaces 52, 54 are curved such that their curvatures extend substantially parallel to each other. In particular, the surfaces 52, 54 are substantially concentric such that they curve about a common axis that extends transverse to (e.g., substantially perpendicular to) the pin direction $D_p$.

In this manner, a user can place their hand around the curved surfaces 52, 54 of the grip member 40 to hold and manipulate the handle device 30. Moreover, the curved nature of the grip member 40 and its gripping surfaces 52, 54 can help provide comfortable surface for the user to grip. However, the grip member 40 can be configured in alternative manners to provide one or more curved gripping surfaces for a user. Moreover, the grip member 40 may have no curved gripping surfaces in some examples.

The abutment member 42 is an elongated body having a planar abutment surface 58 that extends along and defines a mounting plane P of the handle device 30. Moreover, the pins 34 are configured to protrude from the abutment surface 58 along the pin direction $D_p$, which is substantially perpendicular to the mounting plane P. The abutment surface 58 is configured to abut and extend flush against the rear surface 22 of the canvas panel 10 when the handle device is mounted thereto, thereby providing a broad area of contact between the handle device 30 and canvas panel 10 that prevents relative movement between the handle device 30 and canvas panel 10 and enhances stability. In order to increase the area of contact between the handle device 30 and canvas panel 10 and thus increase stability, the surface area of the abutment surface 58 is preferably at least 1.5 square inches, and more preferably at least 2.5 square inches.

For further stability, the abutment surface 58 is preferably elongated such that it can extend along and support a rigid frame member 12 of the canvas panel 10. Moreover, one of the pins 34 is arranged to protrude from one end portion of the elongated surface 58, while the other pin 34 is arranged to protrude from the other end portion of the surface 58. In this manner, the spacing between the pins 34 (and where they attach to the canvas panel 10) can be maximized to further increase stability. However, other configurations of the abutment surface 58 and pins 34 are possible in other embodiments. Broadly speaking, the abutment surface 58 of the abutment member 42 can be any surface that is planar and configured to abut and extend flush against the canvas panel 10 when the handle device 30 is mounted thereto.

The first and second spacing members 44a, 44b each have one end attached to the abutment member 42 and another end attached to the grip member 40, such that the spacing members 44a, 44b space the grip member 40 from the abutment member 42 and canvas panel 10. Moreover, the first and second spacing members 44a, 44b are spaced apart from and extend substantially parallel to each other. In this manner, a gap is provided between the grip member canvas panel 10, and spacing members 44a, 44b that a user can place their hand within to grab and hold the grip member 40. Specifically, the gap is defined by the grip member 40, abutment member 42, and spacing members 44a, 44b.

It is to be appreciated that the number and configuration of the members 40, 42, 44a, 44b of the handle device 30 can vary in different embodiments. For instance, the handle device in some examples may exclude the abutment member 42, such that the spacing members 44a, 44b are directly attached to the pins 34 and will directly abut the canvas panel 10 when mounted thereto. Moreover, in some examples, the handle device 30 may have a single spacing member 44 that spaces the grip member 40 from the abutment member 42 and canvas panel 10. Broadly speaking, the main body 32 of the handle device 30 can comprise any configuration of one or more members that support the pin(s) 34 and provide a gripping portion for a user.

As discussed above, the handle device 30 can be removably attached to the canvas panel 10 by pushing its pins 34 along the pin direction $D_p$ into a portion of the canvas panel 10. For example, the handle device 30 shown in FIG. 2 is attached to the left frame member 12a of the canvas panel 10 and is arranged such that its abutment member 42 extends along the left frame member 12a, substantially parallel thereto. Another handle device 30 (not visible in FIG. 2) can be similarly attached to the right frame member 12c of the canvas panel 10 and arranged such that its abutment member 42 extends along the right frame member 12c, substantially parallel thereto. In this manner, a user can grip and manipulate either or both of the handle devices 30 as desired to support and/or manipulate the canvas panel 10 attached thereto, without having to touch the painting surfaces 18, 20a-d of the canvas panel 10.

Furthermore, as shown in FIG. 2, the handle device 30 can be configured to rest on a horizontal planar surface 60 in a resting position. In this position, the main body 32 of the handle device 30 can support its pins 34 and the canvas panel 10 attached thereto such that the canvas panel 10 is elevated above the planar surface 60. Moreover, the mounting plane P, the front and rear surfaces 18, 22 of the canvas panel 10, and the abutment surface 58 of the abutment member 42 can all extend substantially parallel to the planar surface 60, while the pins 34 and spacing members 44a, 44b extend substantially perpendicular to the planar surface 60.

Preferably, the handle device 30 is configured such that at least a portion of its grip member 40 will be spaced from the planar surface 60 in the resting position. For instance, the handle device 30 in the present embodiment has a pair of standoff members 64a, 64b that respectively extend from the handle device's main body 32 in first and second standoff directions $D_{s1}$, $D_{s2}$ (see FIG. 3) away from the pin direction $D_p$. The standoff members 64a, 64b will rest directly against the planar surface 60 in the resting position and support the main body 32 such that they space the grip member 40 from the planar surface 60. In this manner, a gap can be provided between the grip member 40, planar surface 60, and standoff members 64a, 64b that a user can place their hand within to grab and hold the grip member 40.

The standoff members 64a, 64b in the present embodiment are integrally formed with the main body 32 and extend from opposite end portions of its grip member 40 in first and second standoff directions $D_{s1}$, $D_{s2}$ that are both opposite and substantially parallel to the pin direction $D_p$. However, other numbers and configurations of the standoff members 64a, 64b are possible without departing from the scope of the disclosure. For instance, the standoff members 64a, 64b may extend from other portions of the main body 32 in directions that are transverse to the pin direction $D_p$. Still further, the handle device 30 may exclude the standoff members 64a, 64b members in some embodiments, such that the main body 32 rests directly against the planar surface 60 in the resting position. In such embodiments, a gap can still be provided between the grip member 40 and the planar surface 60 if, for example, the grip member 40 is curved or recessed.

Illustrative embodiments have been described, hereinabove. For the purposes of this disclosure, the phrase "substantially perpendicular" as used herein means within 15° or less of perpendicular, and preferably within 10° or less of perpendicular; and the phrase "substantially parallel" as used herein means within 15° or less of parallel, and preferably within 10° or less of parallel. It will be apparent to those skilled in the art that the features described above may incorporate changes and modifications without departing from the scope of this disclosure. The invention is therefore not limited to particular details of this disclosure, and will encompass modifications and adaptions thereof within the spirit and the scope of the appended claims.

What is claimed is:

1. A method of using a handle device for a canvas panel, the handle device comprising:
a main body comprising an abutment member, a grip member, and a first spacing member that spaces the grip member from the abutment member;
a first standoff member extending from the main body; and
a pin protruding from the main body in a pin direction,
wherein the first spacing member extends from the abutment member to the grip member in a direction substantially parallel to the pin direction,
wherein the method includes removably attaching the handle device to the canvas panel by inserting the pin into the canvas panel, and
wherein the handle device is configured to rest on a horizontal planar surface in a resting position while the handle device is removably attached to the canvas panel, such that:
the first standoff member rests directly on the planar surface and supports the main body, and
a gap is present between the planar surface and the grip member.

2. The method of claim 1, wherein the first standoff member protrudes from the main body in a first standoff direction opposite to the pin direction.

3. The method of claim 2, further comprising a second standoff member spaced from the first standoff member and protruding from the main body in a second standoff direction opposite to the pin direction, wherein the second standoff member rests directly on the planar surface in the resting position.

4. The method of claim 3, wherein the first standoff direction and second standoff direction are substantially parallel.

5. The method of claim 1, the main body further comprising a second spacing member, the grip member having a first end portion attached to the first spacing member and a second end portion attached to the second spacing member.

6. The method of claim 1, wherein the method includes resting the handle device on the horizontal planar surface in the resting position while the handle device is removably attached to the to the canvas panel, such that the first standoff member rests directly on the planar surface and supports the main body, and the gap is present between the planar surface and the grip member.

7. A handle device for a canvas panel, said handle device comprising:
a main body comprising:
an abutment member, the abutment member being an elongated body having an abutment surface that is planar,
a grip member, and
a first spacing member having one end attached to the abutment member and another end attached to the grip member such that the first spacing member spaces the grip member from the abutment member;
a first pin protruding from the abutment surface of the abutment member, wherein the pin protrudes from the main body in a pin direction, and
a first standoff member extending from the main body, wherein the first standoff member protrudes from the main body in a first standoff direction opposite to the pin direction;
wherein the handle device is configured to be removably attachable to the canvas panel by inserting the first pin into the canvas panel such that the abutment surface of the abutment member abuts and extends flush against the canvas panel, and
wherein the first spacing member extends from the abutment member to the grip member in a direction substantially parallel to the pin direction.

8. The handle device of claim 7, further comprising a second spacing member spaced from the first spacing member, wherein one end of the second spacing member is attached to the abutment member and another end of the second spacing member is attached to the grip member such that the second spacing member spaces the abutment member and grip member.

9. The handle device of claim 8, wherein the first spacing member and second spacing member extend substantially parallel to each other.

10. The handle device of claim 7, further comprising a second pin, wherein the first pin protrudes from a first end portion of the abutment surface and the second pin protrudes from a second end portion of the abutment surface.

11. The handle device of claim 7, further comprising:
a second spacing member spaced from the first spacing member, wherein one end of the second spacing member is attached to the abutment member and another end of the second spacing member is attached to the grip member such that the second spacing member spaces the abutment member and grip member, and a second standoff member spaced from the first standoff member and protruding from the main body in a second standoff direction opposite to the pin direction.

12. The handle device of claim 11, wherein:
the first spacing member and second spacing member extend substantially parallel to each other, and
the first standoff direction and second standoff direction are substantially parallel.

13. The handle device of claim 7, the grip member being an elongated body with one or more curved gripping surfaces.

14. A method of using the handle device of claim 7, wherein the method includes removably attaching the handle device to the canvas panel by inserting the first pin into the canvas panel such that the abutment surface of the abutment member abuts and extends flush against the canvas panel.

15. The method of claim 14, wherein when the handle device is attached to the canvas panel, a gap is present between the grip member and the canvas panel.

* * * * *